May 28, 1957 J. PARARRA 2,793,604
STOP SIGNAL FOR BICYCLES
Filed Jan. 31, 1955 2 Sheets-Sheet 1
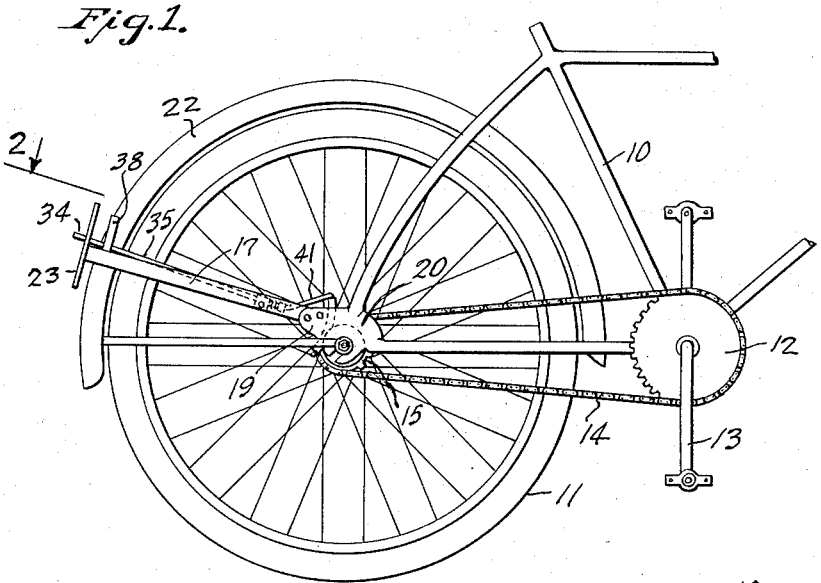
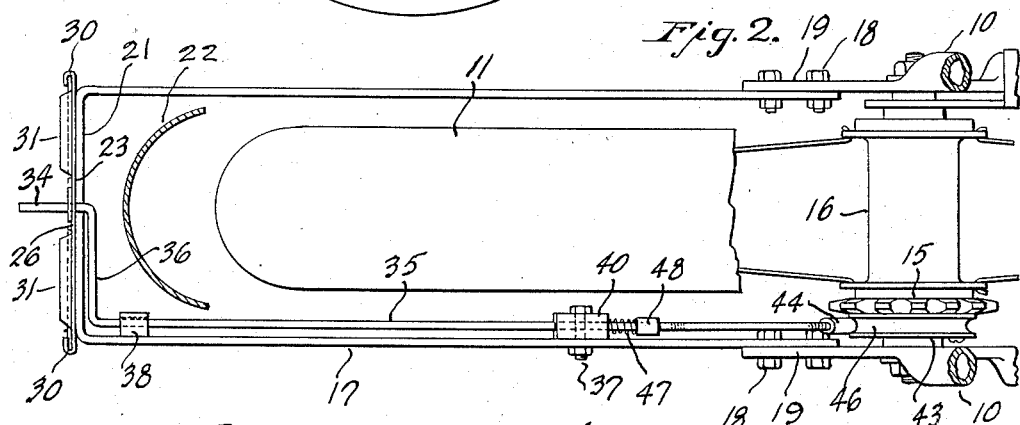
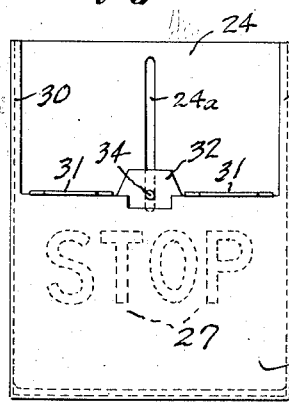
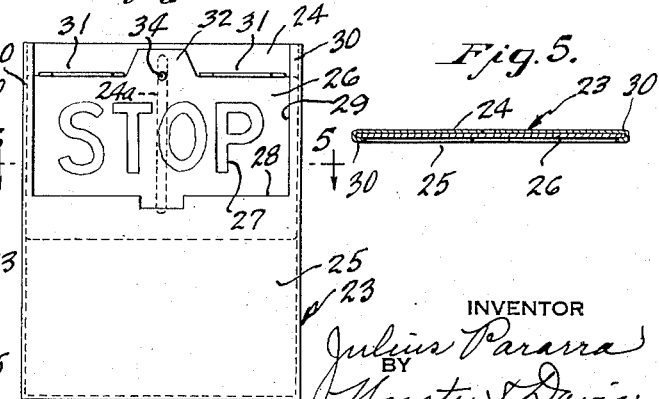
INVENTOR
Julius Pararra
BY
Wooster & Davis
ATTORNEYS.

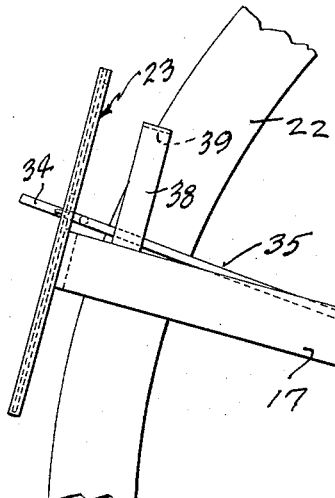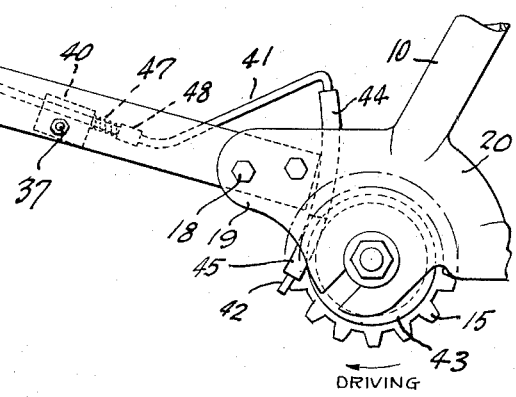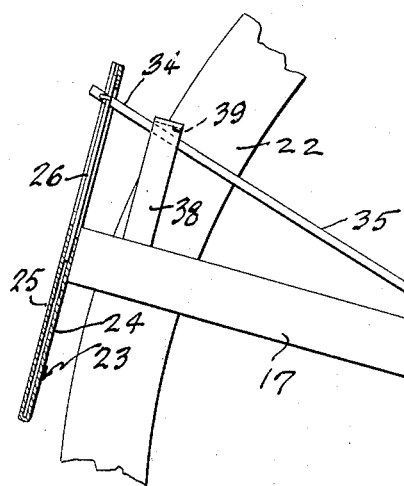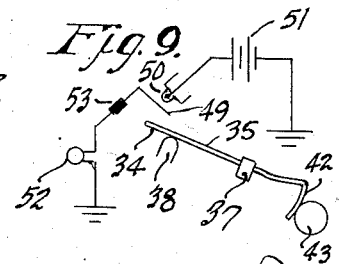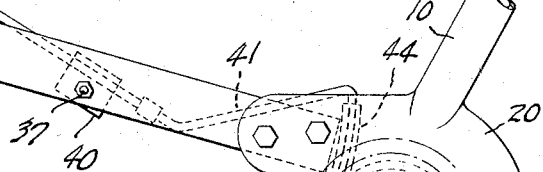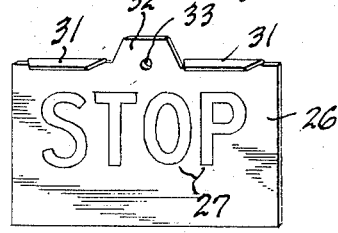
INVENTOR
Julius Pararra
BY
Wooster & Davis
ATTORNEYS.

United States Patent Office 2,793,604
Patented May 28, 1957

2,793,604

STOP SIGNAL FOR BICYCLES

Julius Pararra, Bridgeport, Conn., assignor to Alfonso Losada, Bridgeport, Conn.

Application January 31, 1955, Serial No. 485,135

7 Claims. (Cl. 116—36)

This invention relates to a stop signal for bicycles or for similar vehicles, and has for an object to provide for a bicycle or the like a simple and effective indicating means to automatically indicate, to the driver of a motor vehicle or the like following a cyclist, when the cyclist slows down or brings his bicycle to a stop.

Another object is to provide a device of this character in which the stop or indicating signal is operated automatically by the action of the cyclist in applying his brake to slow up or stop the bicycle.

Still another object is to provide a device of this character in which means for operating the stop signal is operated by a reverse movement of the driving sprocket of the bicycle used in applying the coaster-brake.

With the foregoing and other objects in view, I have devised the construction illustrated in the accompanying drawings forming a part of this specification. It is, however, to be understood the invention is not limited to the specific details of construction and arrangement shown but may embody various changes and modifications within the scope of the invention.

In these drawings:

Fig. 1 is a side view of the rear frame portion and wheel of a bicycle showing one form of this device applied thereto;

Fig. 2 is a partial top plan and horizontal section on a larger scale, the section being substantially on the plane of line 2 of Fig. 1;

Fig. 3 is a rear view of the stop signal used in Figs. 1 and 2 showing it in the retracted or "off" position;

Fig. 4 is a similar view showing the stop signal in the advanced or "on" position;

Fig. 5 is a transverse section substantially on the line 5—5 of Fig. 4;

Fig. 6 is a side view of the signal and the operating means looking toward the bottom of Fig. 2 showing the signal in the "off" position;

Fig. 7 is a similar view showing the signal in the "on" position;

Fig. 8 is a perspective view of the shiftable member of the stop signal, and

Fig. 9 is a diagrammatical view showing how the device may be employed for operating an electric stop light.

The device is shown as applied to a standard type of bicycle comprising a frame 10 and the rear wheel 11, the front wheel, handlebars, saddle and front portion of the frame being omitted. This wheel is driven by the usual sprocket 12 operated by the pedals 13 and the chain connection 14 from the sprocket 12 to the smaller rear sprocket 15 operating the wheel 11 through a coaster-brake enclosed within the hub 16 of this rear wheel. As is well known, operation of the sprocket 12 forwardly or clockwise as shown in Fig. 1 and through the chain 14 will operate the rear sprocket 15 in the same direction, and this sprocket operates through a one-way clutch within the hub 16 to drive the wheel forwardly. It is also well known that the brake of the so-called coaster-brake type is applied by the cyclist back-pedalling so as to turn or rotate the rear sprocket 15 in a backward or reverse direction. This reverse movement of this sprocket is used in this invention for operating the stop signal to bring it into view if a mechanical type signal is used, or to operate a switch to light the stop light if an electrical type of stop light is used, to thus indicate to a driver of a motor car or other vehicle following the bicycle that the bicyclist is applying his brake and is either going to slow up or stop. In the drawing the mechanical type of stop signal is shown in Figs. 1 to 8, while Fig. 9 shows diagrammatically how this type of apparatus may be used to operate an electrical stop light or switch.

The construction and arrangement shown comprises a support or bracket 17 formed of a strip of flat material such, for example, as light weight metal bent to substantially U-shape with the free end of the side members secured by any suitable means, such, for example, as the bolts 18 to suitable lugs 19 on the rear axle supporting portion 20 of the bicycle frame. This bracket 17 extends rearwardly from this portion of the frame, with its connecting bar 21 located immediately to the rear of mudguard 22 of the bicycle. The stop signal is mounted on this connecting or transverse bar 21, and in the simple specific form shown comprises a flat housing 23 made of light weight metal or other suitable material comprising front and rear walls 24 and 25 respectively, between which is mounted to slide a flat plate 26 carrying an indication, such as the word "Stop" 27 in suitable letters contrasting to the background formed by the plate 26, such as a contrasting color, or it could be light-reflecting letters. The upper portion of the rear wall 25 of the housing is cut away, as shown at 28, with its outer edges 29 spaced a short distance from the upright side edges forming guides 30 for the opposite side edges of the plate 26 to permit this plate to slide vertically in the housing from a lower position as shown in Fig. 3, where the signal, in this case comprising the word "Stop" shown in dotted lines, is covered by and hidden behind the lower portion of the rear wall 25, to an upper position, as shown in Fig. 4, where the indication comprising the word "Stop" is exposed in the opening 28 and visible to a following motorist or other person. The plate 26 carrying the indication is provided with short rearwardly extending flanges 31 on its upper edge, as shown more clearly in Fig. 8, to act as a stop on the bottom edge of the opening 28 and limit downward movement of the plate 26 as well as form a stiffening or strengthening means for the plate. It would also have a central lug 32 in which is an opening 33 to receive the forward end 34 of an operating lever 35, running in a vertical slot 24a in the rear wall 24 of the housing. It will be understood that this device is not limited to the stop signal shown, but that any suitable form of stop signal may be used and operated or controlled by the lever 35.

This operating lever 35 may be of any suitable shape or material, but in the construction shown comprises a rod or heavy wire offset at 36 so that the body portion of the lever is located at the inner side of one of the side members of the supporting bracket 17 and is pivoted thereto as shown at 37. The rear portion of this lever is preferably guided for upward movement by an upright guide member 38 mounted on the bracket 17 and having a top wall 39 over the lever forming a limit stop to limit upward movement of this lever. The lever is mounted by any suitable means, but in the arrangement shown passes through an opening in a supporting block 40 pivoted on the bracket 17 at 37, and is secured to this block. The forward end of the lever is bent upwardly and inclined, as shown at 41, and is then bent downwardly to form a curved portion 42 on the arc of a curve having a center at the pivot 37, and engages the rear side of a hub 43 which may be either an integral part of the sprocket 15 or a separate member secured to this sprocket so as to rotate with it. To increase the frictional engagement between the curved portion 42 and the hub this curved portion may be covered with a covering 44 of suitable material, such, for example, as a rubber tube, fabric, or any similar material, with a lower portion 45, which normally engages the hub in forward rotation, of some material which will provide the necessary friction for operation of the lever but will not wear too rapidly, such, for example, as a suitable plastic material. The peripheral surface of the hub 43 may or may not be grooved as indicated at 46, but is preferably grooved to provide a guiding action and also increase surface contact between the curved portion of the lever and the sprocket 12. A spring 47 may also be provided on this lever which retains the curved end 42 in engagement with the hub, this spring being on the lever between the pivot block 40 and a collar 48 adjustably secured to the lever so that by shifting it the force of the spring may be adjusted to apply the proper pressure to the curved end 42 of the lever and the hub. Or if preferred, the curved end 42 could itself be a spring to hold this curved end against the hub. This curved end is shown by way of example as showing one means by which frictional drive between the sprocket and hub and the lever can be secured. Various other arrangements could be used. Another example would be a spring contracted ring extending around the hub in the groove.

The operation is as follows: When the bicycle is being operated forwardly, the sprocket 15, of course, is rotating forwardly or in the clockwise direction as viewed in Figs. 1 and 6. In this operation the frictional engagement between the hub 43 and the covering material on the lever tends to force the curved portion 42 of the lever upwardly to the positions of Figs. 1 and 6 and thus shift the rear free end 34 of the lever downwardly, together with the stop signal plate 26 connected thereto, to their lower or retracted positions and retain them therein. If the cyclist merely stops pedalling and coasts, the sprocket 15 will be held stationary and will have no effect on the lever 35, but if the cyclist starts to apply the brake he will back-pedal, which will apply reverse movement to the sprocket 15, as indicated by the arrow in Fig. 7. This movement of the sprocket will also turn or rotate the connected hub 43 in the reverse direction, and by its frictional contact with the covering material on the portion 42 of the lever will shift this curved portion downwardly, or swing the lever clockwise or to the right about its pivot 37, thus shifting the rear end 34 and the connected stop plate 26 upwardly, and shifting the indication 27 from its lower or retracted dotted-line position out of sight, indicated in Fig. 3, to its upper advanced or exposed position as indicated in Fig. 4, to indicate to the following motor vehicle driver that the cyclist is applying his brakes and is thus either slowing up or stopping. As soon as the cyclist starts to pedal forwardly, and thus rotates the sprocket 15 and hub 43 forwardly, frictional engagement between this hub and the curved forward end of the lever, together with the weight of plate 26, will again shift this forward end of the lever to its upper position of Fig. 6 and will shift the indicator plate 26 back to its original position in the lower part of the housing 23.

In the arrangement of Fig. 9, the lever 35 is mounted and operated the same as in the previous figures by the hub 43 on the rear sprocket. In this case, however, the rear free end 34 when shifted to its upper position will engage a spring contact 49 and shift it into engagement with a stationary insulated contact 50, both of which are in an electric circuit including the battery 51 and a stop light 52 mounted on any suitable rear portion of the bicycle, such, for example, as the bracket 17 or the mudguard 22, the spring contact 49 being also mounted on any suitable insulating support 53. With this arrangement the stop light is automatically operated and controlled by the same operation of the rear sprocket 15 the same as in the first form. This light 52 could itself be the stop signal or it could be used to illuminate a stop signal. For example, the word "Stop" in Figs. 3, 4 and 8 could be formed by perforations in the plate or housing and this light 52 placed behind it to illuminate it when the brake is applied.

It will be seen from the above that this provides a simple and effective means to indicate to the driver of a following motor vehicle, for example, that a boy or person operating a bicycle in front of him is either going to slow up or stop, and that this indication is made automatically and instantly as soon as the bicyclist starts to operate his brake, and thus the stop signal is operated with no conscious effort on the part of the cyclist and with no time lag between the operation of starting to apply the brake and the showing of the stop signal.

Having thus set forth the nature of my invention, I claim:

1. In a bicycle including a wheel driven by a sprocket through a coaster brake and in which the brake is applied by turning the sprocket backwardly, a stop signal carried by the bicycle comprising a housing at the rear thereof, an indicating member having a notation thereon slidable vertically in the housing between a lower position with the notation concealed in the housing and an upper exposed position, a hub connected to the sprocket to turn therewith, a pivoted lever having one end connected with the indicating member to shift it, and means on the other end having frictional engagement with the hub to operate the lever on reverse movement of the sprocket to shift the indicating member from the lower to the upper position.

2. In a bicycle including a frame, a wheel mounted in the frame including a hub, a coaster brake mounted in the hub including a sprocket for driving the wheel through the brake and in which the brake is applied by turning the sprocket backwardly, a stop signal carried by the frame visible from the rear thereof, a hub connected to the brake sprocket at one side thereof to rotate therewith, and a control means for the stop signal including a pivoted lever provided with a curved end portion frictionally engaging the outer rim of the hub and operable by backward turning movement of the hub to control the signal.

3. In a bicycle including a wheel driven by a sprocket through a coaster brake in which the sprocket is a part of the brake and in which the brake is applied by turning the sprocket backwardly, a coaxial hub connected with said sprocket to turn therewith and provided with a peripheral groove, a stop signal carried by the bicycle visible from the rear thereof, a control means for the stop signal, and means seating in and frictionally engaging the groove operated by backward movement of the hub and sprocket for operating the said control means.

4. In a bicycle including a wheel driven through a coaster brake by a sprocket forming a part of the brake and in which the brake is applied by turning the sprocket backwardly, a stop signal carried by the bicycle and visible from the rear thereof, a pivoted lever movable between a retracted and an advanced position, means operable by movement of the lever to the advanced position to operate the stop signal, a hub connected coaxially to the sprocket to turn therewith, and said lever including means at one end portion frictionally engaging the peripheral surface of the hub and operable by turning movements of the hub to control the stop signal.

5. In a bicycle including a wheel driven by a sprocket through a coaster brake and in which the brake is applied by turning the sprocket backwardly, a stop signal carried by the bicycle comprising a housing at the rear thereof, an indicating member having a notation thereon slidable vertically in the housing between a lower position with the notation concealed in the housing and an upper exposed position, operative means to shift the indicating member from the lower to the upper position, and means operable by reverse movement of the sprocket to operate said operative means.

6. In a bicycle including a wheel driven through a coaster brake including a sprocket forming a part of the brake and in which the brake is applied by turning the sprocket backwardly, a stop signal carried by the bicycle, a coaxial hub connected to the sprocket to turn therewith, a pivoted lever having one end connected with the stop signal for controlling it, and means on the other end having frictional engagement with the peripheral surface of the hub to operate the lever on backward turning movement of the sprocket to operate the stop signal.

7. In a bicycle including a frame, a wheel mounted in the frame driven by a sprocket through a coaster brake and in which the brake is applied by turning the sprocket backwardly, a stop signal carried by the frame visible from the rear thereof, a hub connected to the sprocket to rotate therewith, a control means for the stop signal including a lever, means pivotally mounting the lever on the frame including a pivoted support in which the lever is slidable longitudinally, said lever provided with a curved end portion frictionally engaging the hub to operate the lever to control the signal, and a spring tending to shift the lever longitudinally in its support and yieldably retain its curved end portion against the hub.

References Cited in the file of this patent
UNITED STATES PATENTS 2,728,824　　Whildin _____ Dec. 27, 1955